(12) United States Patent
Urick et al.

(10) Patent No.: US 12,135,923 B2
(45) Date of Patent: *Nov. 5, 2024

(54) MORPHING OF WATERTIGHT SPLINE MODELS USING MANUFACTURING DATA, INSPECTION DATA, AND PRODUCT MANUFACTURING INFORMATION

(71) Applicant: nVariate, Inc., Austin, TX (US)

(72) Inventors: Benjamin Urick, Roseville, CA (US); Richard H. Crawford, Austin, TX (US); Daniel L. Keller, Waitsfield, VT (US); Lisa A. Torres, Austin, TX (US)

(73) Assignee: nVariate, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,827

(22) Filed: Apr. 11, 2024

(65) Prior Publication Data

US 2024/0281572 A1 Aug. 22, 2024

Related U.S. Application Data

(63) Continuation of application No. 18/352,871, filed on Jul. 14, 2023, now Pat. No. 11,989,493.

(60) Provisional application No. 63/434,732, filed on Dec. 22, 2022, provisional application No. 63/389,799, filed on Jul. 15, 2022.

(51) Int. Cl.
*G06F 30/17* (2020.01)
*G06T 17/20* (2006.01)

(52) U.S. Cl.
CPC ............ *G06F 30/17* (2020.01); *G06T 17/205* (2013.01)

(58) Field of Classification Search
CPC .............................. G06F 30/17; G06T 17/205
See application file for complete search history.

(56) References Cited

U.S. PATENT DOCUMENTS

| 7,274,364 | B2 | 9/2007 | Sederberg |
| 9,269,189 | B1 | 2/2016 | Marinov et al. |
| 9,652,696 | B2 | 5/2017 | Won |
| 9,996,075 | B2 | 6/2018 | Simon et al. |
| 2017/0368753 | A1 | 12/2017 | Yang et al. |

(Continued)

OTHER PUBLICATIONS

Urick, B., et al. "Reconstruction of Trimmed NURBS Surfaces for Gap-Free Intersections" J. Computing & Information Science in Engineering, vol. 20 (2020) (Year: 2020).*

(Continued)

*Primary Examiner* — Jay Hann
(74) *Attorney, Agent, or Firm* — Kowert, Hood, Munyon, Rankin & Goetzel, P.C.; Jeffrey C. Hood; Luke Langsjoen

(57) ABSTRACT

Methods and computer systems for methods, computer systems, and computer-readable memory media for determining a warp function. A first watertight spline model of a first object and a set of points and associated metadata from a second object are received. A second watertight spline model of the second object is constructed based on the set of points, the metadata, and the first watertight spline model. A warp function is determined based on a difference between the first watertight spline model and the second watertight spline model. The warp function is a continuous function approximating differences between the first object and the second object. The warp function is stored in a non-transitory computer-readable memory medium.

21 Claims, 11 Drawing Sheets

(56) References Cited

U.S. PATENT DOCUMENTS

| | | |
|---|---|---|
| 2020/0074028 A1 | 3/2020 | Yang et al. |
| 2023/0117766 A1 | 4/2023 | Yang et al. |
| 2023/0264264 A1 | 8/2023 | Prentice et al. |

OTHER PUBLICATIONS

R. T. Farouki, "Trimmed-surface algorithms for the evaluation and interrogation of solid boundary representations," IBM J. Res. Dev., vol. 31, No. 3, pp. 314-334, May 1987.

N. M. Patrikalakis, "Surface-to-surface intersections," IEEE Comput. Graph. Appl., vol. 13, No. 1, pp. 89-95, 1993.

N. M. Patrikalakis and P. V. Prakash, "Surface Intersections for Geometric Modeling," J. Mech. Des., vol. 112, No. 1, pp. 100-107, Mar. 1990.

T. W. Sederberg, D. C. Anderson, and R. N. Goldman, "Implicit representation of parametric curves and surfaces," Comput. Vis. Graph. Image Process., vol. 28, No. 1, pp. 72-84, Oct. 1984.

T. W. Sederberg, G. T. Finnigan, X. Li, H. Lin, and H. Ipson, "Watertight trimmed NURBS," ACM Trans Graph, vol. 27, No. 3, p. 79:1-79:8, Aug. 2008.

B. Urick, B. Marussig, E. Cohen, R. H. Crawford, T. J. R. Hughes, and R. F. Riesenfeld, "Watertight Boolean operations: A framework for creating CAD-compatible gap-free editable solid models," Comput.-Aided Des., vol. 115, pp. 147-160, Oct. 2019.

B. Urick, R. H. Crawford, R. Jennings, and G. Vernon, "Watertight Tensor-Product Spline Reconstruction," United States Department of Energy, Kansas City, Missouri, Technical Report NSC-614-2949, 31 pages, Jul. 2020.

International Search Report and Written Opinion in International Application No. PCT/US2023/027831, mailed Dec. 18, 2023, 21 pages.

Invitation to Pay Additional Fees and, Where Applicable, Protest Fee and Partial International Search in International Application No. PCT/US2023/027831, mailed Oct. 26, 2023, 14 pages.

Lei et al; "NURBS-based fast geometric error compensation for CNC machine tools", International Journal of Machine Tool Design and Research, Pergamon Press, Oxford, GB, vol. 48, No. 3-4, Oct. 24, 2007, pp. 307-319.

Praveen, K., et al., "Tool path design system to enhance accuracy during double sided incremental forming: An analytical model to predict compensations for small/large components", J. Manufacturing Processes, vol. 58, pp. 510-523; Year 2020.

Zhang, B., et al., "Distortion Prediction and NURBS Based Geometry Compensation for Reducing Part Errors in Additive Manufacturing", Procedia Manufacturing, vol. 48, pp. 706-717, Year 2020.

\* cited by examiner

Trimmed surfaces (exploded)

Untrimmed surfaces

Rendered image

MORPHING OF WATERTIGHT SPLINE MODELS USING MANUFACTURING DATA, INSPECTION DATA, AND PRODUCT MANUFACTURING INFORMATION

PRIORITY CLAIM

This application is a continuation of U.S. application Ser. No. 18/352,871, titled "Morphing of Watertight Spline Models Using Manufacturing Data, Inspection Data, and Product Manufacturing Information", filed Jul. 14, 2023; which claims benefit of priority to Provisional Application No. 63/389,799 titled "Morphing of Watertight Spline Models Using Manufacturing Data, Inspection Data, and Product Manufacturing Information", filed on Jul. 15, 2022, and Provisional Application No. 63/434,732 titled "Morphing of Watertight Spline Models Using Manufacturing Data, Inspection Data, and Product Manufacturing Information", filed on Dec. 22, 2022, all of which are hereby incorporated by reference as though fully and completely set forth herein.

ACKNOWLEDGEMENT OF GOVERNMENT SUPPORT

This invention was made in part with Government support under Honeywell Federal Manufacturing and Technologies (HFMT) Purchase Order Number: N000420609. The purchase order was issued under HFMT's prime contract DE-NA0002839 and awarded by the United States Department of Energy. The Government has certain rights in the invention.

FIELD OF THE INVENTION

The present invention relates to methods of producing computer representations of manufactured components and more generally to the fields of computer-aided design (CAD), computational simulation, computational analysis, industrial metrology, quality engineering, product inspection, digital twins, digital thread, digital lifecycle, and related fields.

DESCRIPTION OF THE RELATED ART

The computer-aided design of models for representing objects is fundamentally important to a variety of industries such as computer-aided engineering (CAE), computer-aided manufacturing (CAM), computer-aided inspection (CAI), product lifecycle management (PLM), computer graphics and animation. For example, a model may be used as the basis of an engineering analysis, to predict the physical behavior of the object. The results of such analysis may be used in a wide variety of ways, e.g., to inform changes to the design of the object, to guide selection of material(s) for realization of the object, to determine performance limits (such as limits on temperature, vibration, pressure, shear strength, etc.), and so forth. As another example, a model may be used to direct the automated manufacturing of the object (e.g., through subtractive manufacturing processes, additive manufacturing, or other means). A model may be used to plan, direct, and report on an in-situ or post-manufacturing inspection process (via manual, coordinate measuring, optical, CT scan, or other means). As another example, the various models used in each engineering discipline (e.g., design, engineering, manufacturing, inspection, etc.) may be managed in a database system to track changes to them during their lifecycle. As yet another example, a model may be used to generate an image (or a sequence of images, e.g., as part of an animation of the object). These activities may represent typical product design development steps found across industrial market verticals such as automotive, aerospace, medical devices, and oil and gas.

Modern CAD software applications may be built on software kernels that utilize restrictive mathematical assumptions to approximate compound geometric objects. As a result, critical information may not be explicitly modeled, forcing designers, engineers, manufacturers, animators, etc., to repair CAD models and convert them into an acceptable format, such as polygonal meshes for finite element analysis (FEA) or computational fluid dynamics (CFD), 3-D printing or additive manufacturing, character animation, etc. This conversion is typically an iterative process, creating substantial amounts of work for product development teams. Designers, engineers, manufacturers, animators, etc., waste countless hours manually repairing gaps in models and dealing with redundant one-way file conversion operations, causing significant productivity losses, increased time to market and user frustration and dissatisfaction. As such, improvements in the field of CAD modeling may be desirable.

SUMMARY

Embodiments are presented herein of methods, computer systems, and computer-readable memory media for determining a warp function.

In some embodiments, a first watertight spline model of a first object is received. The first watertight spline model may be an as-designed CAD model of an object design. A set of points and associated metadata from a second object may also be received. The set of points may be measurement points of an as-inspected physical object.

In some embodiments, a second watertight spline model of the second object is constructed based on the set of points, the metadata, and the first watertight spline model. The second watertight spline model may be an inspection model of the as-inspected physical object.

In some embodiments, a warp function is determined based on a difference between the first watertight spline model and the second watertight spline model. The warp function is a continuous function describing differences between the first object and the second object.

In some embodiments, the warp function is stored in a non-transitory computer-readable memory medium.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Embodiments of the invention will now be described with reference to the attached drawings in which.

Figure 1:
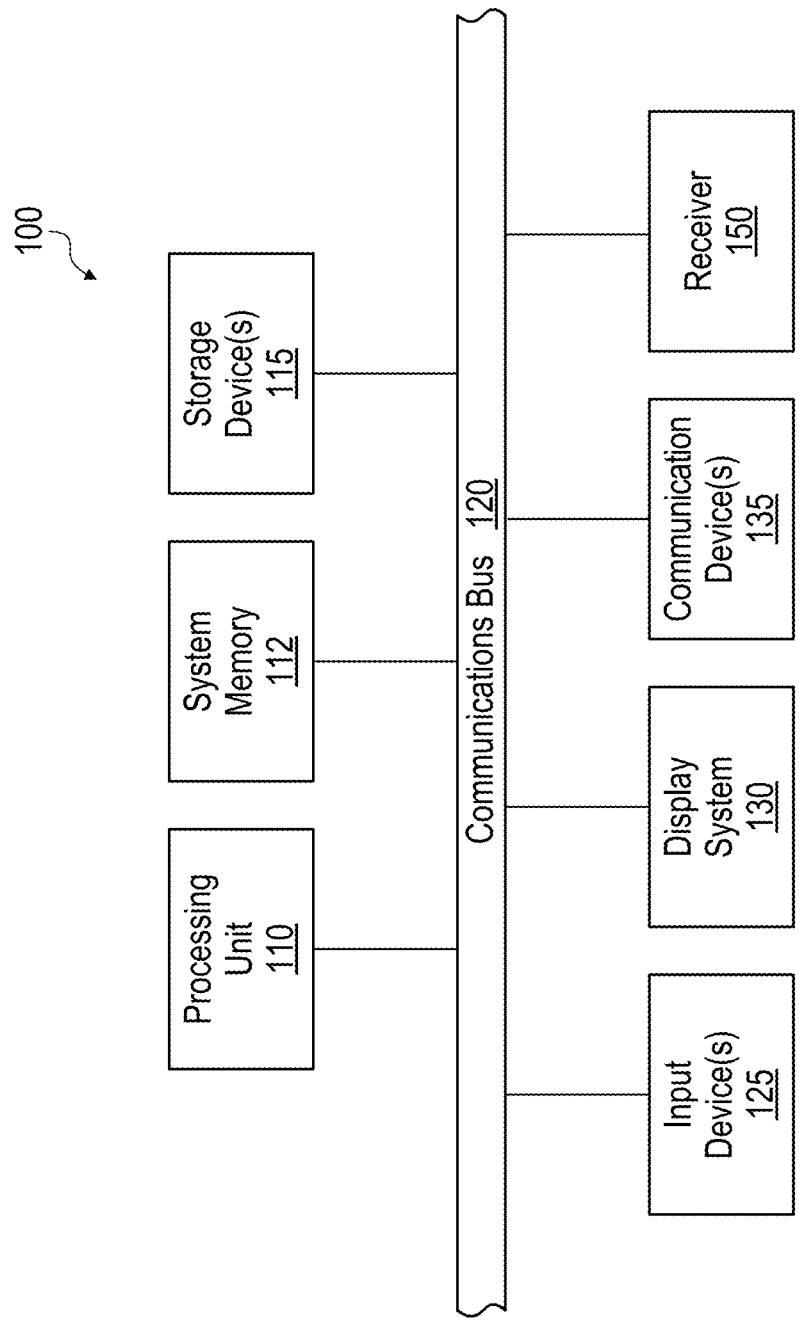
FIG. 1 is an illustration of an exemplary computer system that may be used to perform any of the method embodiments described herein, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION OF THE EMBODIMENTS

Acronyms

Various acronyms are used throughout the present application. Definitions of the most prominently used acronyms that may appear throughout the present application are provided below:
CAD: Computer-Aided Design
CAE: Computer-Aided Engineering
CAM: Computer-Aided Manufacturing
CAI: Computer-Aided Inspection
CAx: Computer-Aided x=[Design, Engineering, Manufacturing, . . . ]
B-Rep, B-rep, BREP: Boundary Representation
NURBS: Non-Uniform Rational Basis Spline
SSI: Surface-Surface Intersection
AM: Additive Manufacturing
ASME: American Society of Mechanical Engineers
BOC: Bill of Characteristics
BOM: Bill of Materials
CMM: Coordinate Measuring Machine
CNC: Computer Numerical Control
CFD: Computational Fluid Dynamics
CSG: Constructive Solid Geometry
CT: Computed Tomography
FEA: Finite Element Analysis
GD&T: Geometric Dimensioning and Tolerancing
ISO: International Organization for Standardization
MBD: Model Based Design, Model Based Definition
MBE: Model Based Enterprise
PLM: Product Lifecycle Management
PMI: Product and Manufacturing Information
QIF: Quality Information Framework
STEP: Standard for the Exchange of Product model data (ISO 10303)
UUID: Universally Unique IDentifier
WBO: Watertight Boolean Operations
XML: eXtensible Markup Language Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), tablet computer, smart phone, television system, grid computing system, or other device or combinations of devices. In general, the term "computer system" can be broadly defined to encompass any device (or combination of devices) having at least one processor that executes instructions from a memory medium.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system.

Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to—" Reciting a component that is configured to perform one or more tasks is expressly intended not to invoke 35 U.S.C. § 112, paragraph six, interpretation for that component.

DETAILED DESCRIPTION

Computer-Aided Design (CAD) Systems

Modern computer-aided design (CAD) systems provide an environment in which users may create and edit curves and surfaces. The curves may include spline curves such as basis spline (B-spline) curves, or more generally, Non-Uniform Rational B-Spline (NURBS) curves. The surfaces may include tensor product spline surfaces such as B-spline surfaces, or more generally, NURBS surfaces, or even more generally, T-spline surfaces. T-Spline surfaces allow the freedom of having T-junctions in the control net of the surface. Tensor product spline surfaces have certain very desirable properties that make them popular as modeling tools, e.g., properties such as: localized domain of influence of each surface control point on surface geometry; controllable extent of continuity along knot lines; $C^0$ smoothness between knot lines; and the ability to represent complex freeform geometry in a discrete manner that is intuitive for the user.

Two significant paradigms within computer-aided design with regards to the geometric modeling of an object are surface modeling and solid modeling.

In surface modeling, an object is represented simply as a set of unconnected surfaces, without maintaining a model of the topological structure corresponding to the relationships between the geometric features of the object. Thus, while the user may design two trimmed surfaces within an object that apparently intersect along a given curve, the CAD system does not explicitly record the topological or geometric relationship between the trimmed surfaces. Thus, in surface modeling, surfaces are operated on as independent entities.

In solid modeling, which is utilized for many CAx applications, the specification of an object includes the specification of both topology and geometry, which are captured in a data structure referred to as a boundary representation (Brep, B-rep, b-rep or brep). From the topological point of view, a boundary representation may include faces, edges and vertices, as well as information regarding their interconnectivity and orientation, among other possibilities. (e.g., An object includes a set of faces. Each face is bounded by a set of edges. Each edge is bounded by a pair of vertices.) From the geometric point of view, the boundary representation may include surfaces, curves and points, which correspond respectively to the faces, edges and vertices of the topological point of view. Thus, a boundary representation provides a way to store and operate on a collection of surfaces, curves and points as a unified object. In addition to faces, edges and vertices, many solid modelers provide additional objects to this data structure, such as loops, shells, half-edges, etc.

CAD Modeling for Use in Downstream Applications

In some current implementations, CAD models are not directly suitable for many downstream digital engineering applications, including simulation, additive manufacturing, post-processing, and inspection. Derivative models may be generated to accommodate these downstream applications, typically derived from a neutral file format, such as the ISO 10303 standard (STEP). However, in some current implementations both the CAD model and the derivative models include mathematical inconsistencies, such as non-geometric watertightness, that may create problems for downstream users. This may be a result of inaccuracy of computing complex intersections of the surfaces (e.g., non-uniform rational basis splines (NURBS) or other types of surfaces) used in boundary representations (B-reps). Because of this, surface intersections may be represented as curve approximations. Thus, while CAD B-rep definitions of geometry are topologically watertight (i.e., they are valid solid models), gaps of geometric discontinuity may be introduced at these approximated intersections that do not allow them to be geometrically watertight.

Consequently, extensive healing, geometric simplification, and the creation of additional faceted polygonal mesh derivatives are typically used in downstream engineering applications, where geometric watertightness is an important model parameter. Costs result from the creation of these derivative models in terms of computational labor (for example because the healing, simplification, and derivative creation tasks are often labor intensive) and in the loss of design intent information (e.g., due to making approximations of the original geometry in the derivative models).

Embodiments herein present improved downstream Model Based Enterprise (MBE) inspection/metrology workflows by utilizing a CAD model that is based on watertight splines to obtain a warp function characterizing discrepancies between an as-designed and as-constructed object. In some embodiments, Watertight Boolean Operations (WBO) technology is utilized for a reconstruction algorithm to create geometrically watertight models of test case parts that originate as standard trimmed CAD B-reps. The watertight models consist of untrimmed surface patches of explicit geometric continuity and may be accurate to the same model tolerance employed in existing feature-based CAD systems.

Manufacturing Verification

In manufacturing verification, a manufactured component may be inspected to ensure that quality specifications are met. Quality engineers develop and evaluate a set of specifications, also referred to as Product and Manufacturing Information (PMI), which are annotations to the CAD design model that communicate manufacturing specifications. Two types of PMI are typically utilized in the industry, semantic PMI (e.g., manufacturing notes, surface finish, etc.) that is machine readable with data associated directly to the model and graphical PMI (e.g., dimensions and tolerances as per ASME Y14.5 Geometric Dimensioning and Tolerancing (GD&T)), in which the information is human-readable by presentation in a drawing or rendering.

In some embodiments, the design-inspection workflow may follow one or more of the following five steps: (1) the product is designed and PMI is produced; (2) inspection specifications (e.g., what is being measured) are created based on quality specifications and manufacturing processes; (3) an inspection plan is determined, e.g., methods used for the inspection are determined (e.g., light scan, radius gauge, visual inspection, etc.); (4) the inspection plan is executed, performing inspection and generating inspection data; and (5) data analysis and generation of report. These steps may then be repeated when there are modifications within the design and/or manufacturing process. Automated methods for collecting inspection measurements may be divided into two major types: contact (e.g., Coordinate Measurement Machine (CMM), calipers, gauges, etc.) and non-contact (e.g., light scanning, such as blue light, laser, X-ray Computed Tomography (CT), etc.). Embodiments herein may be applicable to both automated and non-automated collection of inspection measurements, and may be applied to a variety of types of inspection methods. In some embodiments, the inspection information may serve as an input that is agnostic to the means of obtaining the inspection data.

One of the difficulties in analyzing the inspection data is that a formal relationship between physical parts, inspection data, and the CAD design model may be difficult to construct. Some current implementations are unable to directly modify the CAD model to update the representation based on inspection data. The prior art inspection paradigm may involve constructing new meshed or faceted model representations from the inspection data set of points; however, this inspection model has no link or relationship to the CAD design model. In addition, the process of converting the CAD model to a faceted representation may result in the loss of the metadata, including PMI, that may have been attached to the original design model.

Embodiments herein describe a morphing method, in either standard form or utilizing semantic PMI as an additional input, that produces a warp function that characterizes differences between the as-designed and as-manufactured object. First, the relationship between the watertight spline design model and the morphed, as-measured inspection model is created (i.e., a digital twin). Because the watertight spline design model is directly modified in this operation from the input data, it eliminates the painstaking process of generating a mesh, tessellation, or any other intermediate geometric modeling representation based on inspection data. Further, the relationship created between design and morphed inspection model via this method provides a means of maintaining semantic PMI data throughout the design-through-inspection lifecycle. Finally, it serves to standardize the interpretation of inspection data in the inspection plan that in some current implementations is created anecdotally by quality engineers.

FIG. 1: Computer System

FIG. 1 illustrates one embodiment of a computer system 100 that may be used to perform any of the method embodiments described herein, or, any combination of the method embodiments described herein, or any subset of any of the method embodiments described herein, or, any combination of such subsets.

In some embodiments, a hardware device (e.g., an integrated circuit, or a system of integrated circuits, or a programmable hardware element, or a system of programmable hardware elements, or a processor, or a system of interconnected processors or processor cores) may be configured based on FIG. 1 or portions thereof. Any hardware device according to FIG. 1 may also include memory as well as interface circuitry (enabling external processing agents to interface with the hardware device).

Computer system 100 may include a processing unit 110, a system memory 112, a set 115 of one or more storage devices, a communication bus 120, a set 125 of input devices, and a display system 130.

System memory 112 may include a set of semiconductor devices such as RAM devices (and perhaps also a set of ROM devices).

Storage devices 115 may include any of various storage devices such as one or more memory media and/or memory access devices. For example, storage devices 115 may include devices such as a CD/DVD-ROM drive, a hard disk, a magnetic disk drive, a magnetic tape drive, semiconductor-based memory, etc.

Processing unit 110 is configured to read and execute program instructions, e.g., program instructions stored in system memory 112 and/or on one or more of the storage devices 115. Processing unit 110 may couple to system memory 112 through communication bus 120 (or through a system of interconnected busses, or through a computer network). The program instructions configure the computer system 100 to implement a method, e.g., any of the method embodiments described herein, or, any combination of the method embodiments described herein, or, any subset of any of the method embodiments described herein, or any combination of such subsets.

Processing unit 110 may include one or more processors or processing elements configured to execute program instructions stored in memory to perform methods of the described embodiments. In some embodiments the processing unit 110 may be a programmable hardware element that may be utilized to perform the described methods. A programmable hardware element may include various hardware devices comprising multiple programmable function blocks connected via a programmable interconnect. Examples include field programmable gate arrays (FPGAs), programmable logic devices (PLDs), field programmable object arrays (FPOAs) and complex PLDs (CPLDs). The programmable function blocks may range from fine grained (combinatorial logic or look up tables) to coarse grained (arithmetic logic units, graphics processing units (GPUs), or processor cores). A programmable hardware element may also be referred to as "reconfigurable logic". As another option, an integrated circuit with dedicated hardware components such as an application specific integrated circuit (ASIC) may be used to perform the methods described herein.

One or more users may supply input to the computer system 100 through the input devices 125. Input devices 125 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), an accelerometer (or set of accelerometers), or any combination thereof. In some embodiments, the computer system 100 may be configured to receive direct input of PMI data from an apparatus such as a positional probe, a machine tool, or the like.

The display system 130 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 100 may include other devices, e.g., devices such as one or more graphics devices (e.g., graphics accelerators), one or more speakers, a sound card, a video camera and a video card, a data acquisition system.

In some embodiments, computer system 100 may include one or more communication devices 135, e.g., a network interface card for interfacing with a computer network (e.g., the Internet). As another example, the communication device 135 may include one or more specialized interfaces for communication via any of a variety of established communication standards or protocols or physical transmission media.

The computer system 100 may be configured with a software infrastructure including an operating system, and perhaps also, one or more graphics APIs (such as OpenGL®, Direct3D, Java 3D™).

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a computer embedded in a living organism, etc.

Figure 2:
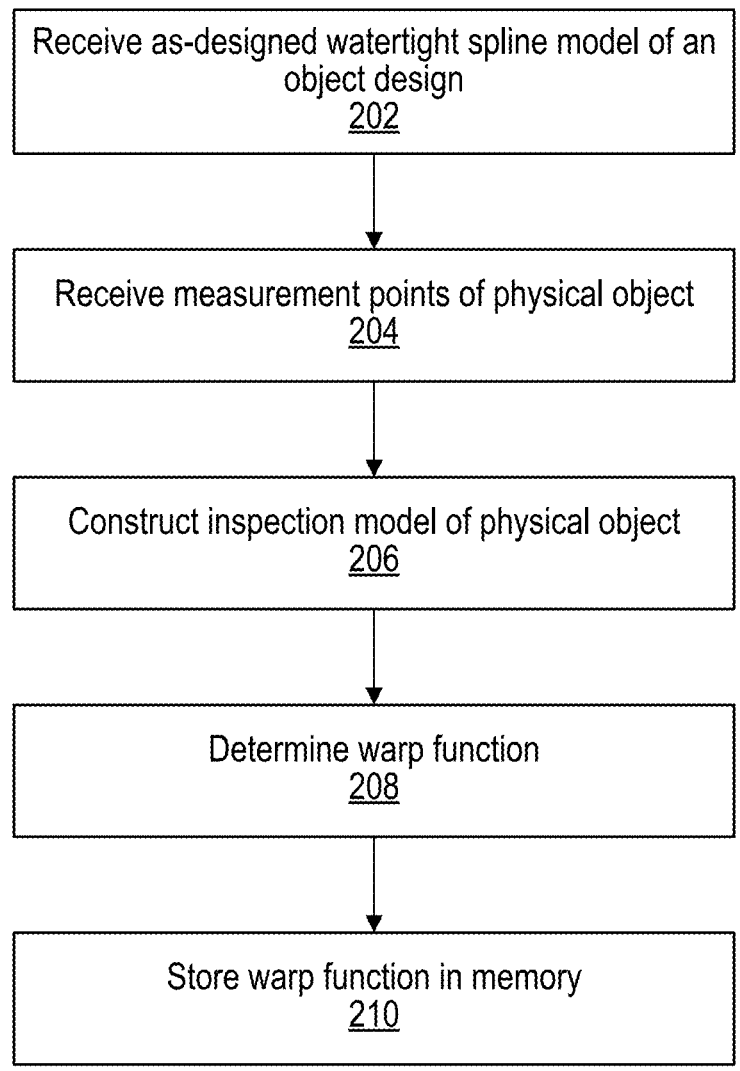
FIG. 2 is a flowchart diagram illustrating a method for determining a warp function, according to some embodiments.

FIG. 2—Flowchart for Determining a Warp Function from a Watertight Spline Model

FIG. 2 is a flowchart diagram illustrating a method for determining a warp function that characterizes discrepancies between first and second watertight spline models. In reference to FIG. 2, the "first" watertight spline model refers to the received model, whereas the "second" watertight spline model refers to the model that is constructed using a received point cloud (and, in some embodiments, also using metadata associated with the point cloud). In some embodiments, the first watertight spline model is an as-designed watertight CAD spline model, and the second watertight spline model is determined from measurements performed on an as-manufactured object that is manufactured using the as-designed model. In this case, the warp function characterizes differences between the target model and the as-manufactured object. In creating a relationship between the CAD design model and the morphed, as-measured inspection model (i.e., a digital twin), watertight modeling may expedite the engineering workflow. The relationship created between the design and the morphed inspection model via the described methods provides a means of maintaining semantic PMI data throughout the design-through-inspection lifecycle. Further, it helps link other engineering domains that currently remain siloed in the design-manufacturing-inspection-simulation process.

More generally, the first and second watertight spline models may be described in any two distinct computer-aided (CAx) model domains, such as CAD, computer-aided engineering (CAE), computer-aided manufacturing (CAM), computer-aided inspection (CAI), etc., and the warp function describes differences between the two models in their respective domains. Workflows may be tightly coupled between the currently disparate engineering domains of CAD, CAI, and CAE, in which as-designed, as-inspected, and as-simulated models are formally related utilizing watertight spline models and warp functions. These models may then benefit from interoperability provided by neutral file standards.

The method shown in FIG. 2 may be used in conjunction with any of the computer systems or devices shown in the above Figures, among other devices. For example, a processor or processing element of a computer device may store program instructions in a non-transitory computer-readable memory medium that, when executed, cause the computer device to perform the recited method steps of receiving, processing, and storing information, as described below. In various embodiments, some of the method elements shown may be performed concurrently, in a different order than shown, or may be omitted.

Additional method elements may also be performed as desired. As shown, this method may operate as follows.

At 202, first watertight spline model of a first object is received. In some embodiments, the watertight spline model may be a geometrically watertight computer-aided design (CAD) spline model, a non-uniform rational basis spline (NURBS) model, a T-spline model, an S-spline model, a U-spline model, a subdivision (Sub-D) surface model, or a basis spline (B-spline) model, among other possibilities.

In some embodiments, the first watertight spline model is an as-designed model, and the first object is an object design. The object design is a design of a physical object that is manufacturable by any of a variety of means (e.g., using computer numerical control (CNC) machining or additive manufacturing (AM), among other possibilities). The object design may be in a format (e.g., CAD), that is receivable by a CNC or AM machine to manufacture the object. The watertight spline model may be a CAD spline model that represents the entire outer surface(s) and/or inner surface(s) of the physical object. For example, the physical object may have internal gaps or voids, in which case the watertight spline model may include these inner surfaces as well as the external-facing surface(s). In other words, the watertight spline model may represent the entirety of the boundary or boundaries of the physical object.

In some embodiments, a computer-aided design (CAD) boundary representation (B-rep) model of the object design is received, and the as-designed watertight spline model is constructed using the CAD B-rep model.

At 204, a set of points from a second object and associated metadata are received. In some embodiments, the set of points are measurement points of the second object, and the second object is a physical object that was based on the object design (e.g., using an AM or CNC process). In these embodiments, the metadata may include product and manufacturing information (PMI), such as semantic PMI, and/or product lifecycle management (PLM) data in the form of defined features, characteristics, material condition, surface finish, machine operator, and/or inspection method, etc. For example, the as-designed CAD part shown in FIG. 6 may be manufactured using a computer numerical control (CNC) machine and inspected using a coordinate measuring machine (CMM). The CMM may produce a point cloud of data with associated PMI related to the inspection feature(s) and characteristic(s), as well as associated data relevant to the inspection process (e.g., a specification of the machine used, the inspection operator, time and duration of inspection, etc.). The point cloud data in the form of spatial locations may be linked to the PMI in a data format that makes the PMI meaningful in physical space at specific locations on the manufactured object.

In some embodiments, rather than receiving measurement points of a physical manufactured object, other sets of points related to the second object may be received. Examples of sets of points may include machine feedback data collected during a manufacturing process of the second object, displacement data generated via finite element or iso-geometric analysis or simulations, shape modification data from a topology or shape optimization algorithm, and/or inspection data from an inspection of a physical object, among other possibilities.

At 206, a second watertight spline model of the second object is constructed based on the set of points and the first watertight spline model. In some embodiments, the second watertight spline model is constructed further based on metadata associated with the set of points. When the set of points include measurement points of an as-inspected physical object, the second spline model is an inspection model of the physical object. Constructing the second watertight spline model may include performing point projection, point inversion, and a surface morph procedure.

In some embodiments, semantic product manufacturing information (PMI) for the object design is received, and the inspection model is constructed based at least in part on the semantic PMI. For example, constructing the inspection model may include determining one or more fit constraints of the second object based on the semantic PMI, and interpolating between adjacent ones of the plurality of measurement points based on the one or more fit constraints. In some embodiments, one or more derivatives or basis function degrees for the second watertight spline model may be determined using geometric constraints indicated by the semantic PMI.

In some embodiments, constructing the inspection model of the second object includes performing an interpolation or approximation procedure of the plurality of measurement points to the as-designed watertight spline model.

In some embodiments, constructing the inspection model includes performing an interpolation or approximation procedure utilizing a spline structure of the as-designed watertight spline model to determine a plurality of control points of the inspection model.

In some embodiments, the inspection model has the same spline structure as the as-designed watertight spline model. For example, constructing the inspection model may include performing an interpolation or approximation procedure utilizing the spline structure of the as-designed model to determine a plurality of degrees, control points and knot vectors of the inspection model. Advantageously, having the same spline structure may facilitate determination of the warp function, by enabling the quantification of differences between the two models.

In some embodiments, after constructing the second watertight spline model, the first watertight spline model may be modified to have the same spline structure as the second watertight spline model. For example, the knot vectors of the second model may be compared to the knot vectors of the first model, and knot insertion may be performed on the first model to add any knots that are present in the second model and absent in the first model. Advantageously, this procedure may result in the first and second models having the same spline structure. In other words, they may have the same values for each of the parameters $\{U, V, N_{i,p}(u), N_{i,p}(v)\}$, so that the two models only differ in their respective sets of control points, $\{P_{i,j}^w\}$ and $\{\hat{P}_{i,j}^w\}$, in homogeneous coordinates, or in their respective sets of control points, $\{P_{i,j}\}$ and $\{\hat{P}_{i,j}\}$, and sets of weights, $\{w_{i,j}\}$ and $\{\hat{w}_{i,j}\}$, in three dimensional Euclidean space. In some cases, the respective weights in sets, $\{w_{i,j}\}$ and $\{\hat{w}_{i,j}\}$, may be set equal such that $w_{i,j}=\hat{w}_{i,j}$ therefore the two models only differ in their respective sets of control points, $\{P_{i,j}\}$ and $\{\hat{P}_{i,j}\}$, in three dimensional Euclidean space. Accordingly, it becomes a straightforward computational procedure to take their difference and obtain the warp function.

At 208, a warp function is determined based on a difference between the first and second watertight spline models (e.g., between the as-designed watertight spline model and the inspection model). The warp function may be a continuous function approximating differences between the first object and the second object (e.g., between the object design and the as-inspected object, or more generally between two objects described in any two distinct CAx domains).

In some embodiments, the warp function may be separated into distinct components, which each may have separate utility in CAx workflows. For example, the warp function $f$d$W$ may be separated into a warp shape $f$ that is identified as $(\Sigma_{i=0}{}^n \Sigma_{j=0}{}^m R_{i,j}(u,v))$, and a product of the warp distance d and warp direction W that is identified as ($\overline{P}_{i,j}-\hat{P}_{i,j}$). Alternatively, the warp function may be separated such that the product $f \cdot d$ is identified as the function $(\Sigma_{i=0}{}^n \Sigma_{j=0}{}^m R_{i,j}(u, v))$, and the warp direction W is identified as $(\overline{P}_{i,j}-\hat{P}_{i,j})$.

In some embodiments, the measurement points are received and the warp function is determined in real time during the manufacturing process of the physical object. In these embodiments, the manufacturing process may be modified in real-time (i.e., while manufacturing the first object) based at least in part on the warp function. For example, the as-designed watertight spline model may be modified to compensate for one or more errors identified in the warp function. Additionally or alternatively, one or more parameters of the machines used to manufacture the object may be modified based on the warp function. For example, control parameters of a machine tool (position, velocity, etc.) may be modified to compensate for errors indicated by the warp function. In some embodiments, the warp function is useable to modify the manufacturing process to reduce a discrepancy between the object design and a subsequent object produced at a later time through the modified manufacturing process.

In some embodiments, a colorized visual representation of the warp function is displayed on a display. An example display of the warp function is shown in gray-scale in FIG. 9, where the shading indicates the discrepancy between the as-designed and the as-inspected model at each point on a cylinder portion of the object.

In some embodiments, the first and second spline models represent the shape of an object with and without being subject to strain. For example, load may be applied to a physical object, and the physical object may be inspected while under strain to obtain measurement points which may be used to determine the second watertight spline model. The warp function that characterizes differences between the two models with and without strain may then be usable to determine a constitutive relationship of the physical object. Examples of constitutive relationships may include a modulus of elasticity, general stress or strain constants or tensors, compressibility, Young's modulus, a shear modulus, and/or a bulk modulus, among other possibilities. The determined constitutive relationship may be used to verify or improve the accuracy of a material model originally defined from data nonspecific to the physical object that is assumed for the physical object.

Current engineering workflows may not provide the ability to determine performance under load for physical objects. Typically, the nominal geometry of a part is computationally analyzed to predict stresses and deflections under an applied load. Determining a warp function for an object with and without strain provides the ability to measure deflections of a part when placed under design loads. The resulting deflections may be used to morph the nominal geometry of a part, feed this model into an analysis program (e.g., finite element analysis), and validate or correct for any modeling assumptions related to the physical object for the part under the design load.

The determined constitutive relationship may characterize a degree of physical or material change in the physical object. For example, these physical or material changes may include wear, fatigue, work hardening, fracture, etc. The object may have a known documented modulus of elasticity (e.g., based on the material composition of the object, or received from the object manufacturer), but the material properties of the object may degrade over time during use. The difference between the documented and determined moduli of elasticity may then indicate the degree to which the material properties of the physical object have degraded. This may be usable, for example, to estimate a remaining useable lifetime of the object before there is a substantial risk of catastrophic failure. In some embodiments, a resilience metric for the physical object may be determined based on the difference between the determined modulus of elasticity and a second modulus of elasticity that is documented for the material composition of the physical object.

At 210, the warp function is stored in a non-transitory computer-readable memory medium. The warp function may then be accessible for any of a variety of design, metrology, inspection, or manufacturing purposes, as described variously herein.

Additional Description

The following numbered paragraphs provide additional technical description related to the described embodiments.

Figure 3C:
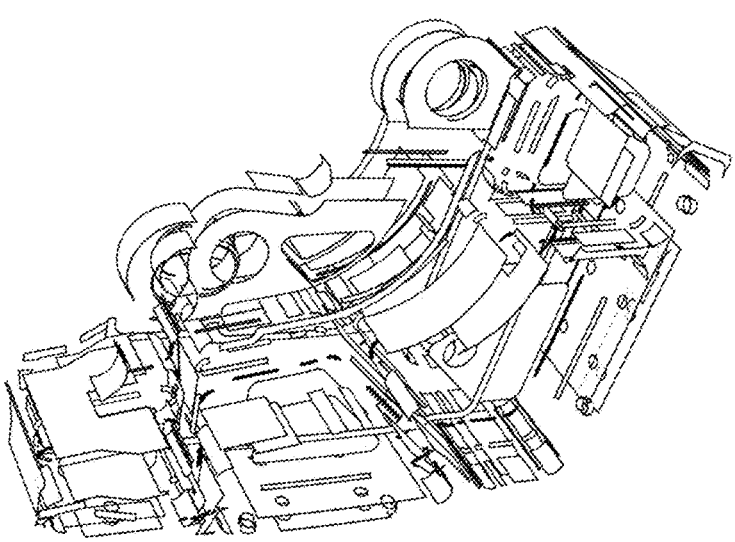
FIGS. 3A-C illustrate a rendered image, the untrimmed surfaces, and the trimmed surfaces of a model, according to some embodiments.
Figure 3B:
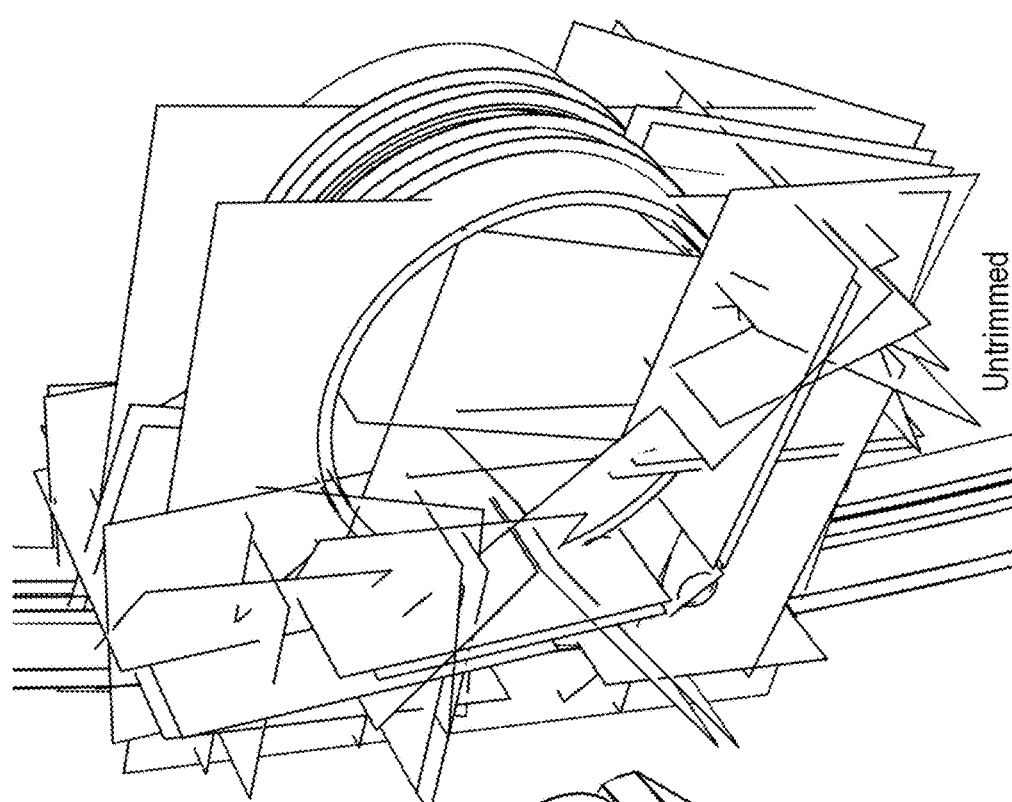
Figure 3A:
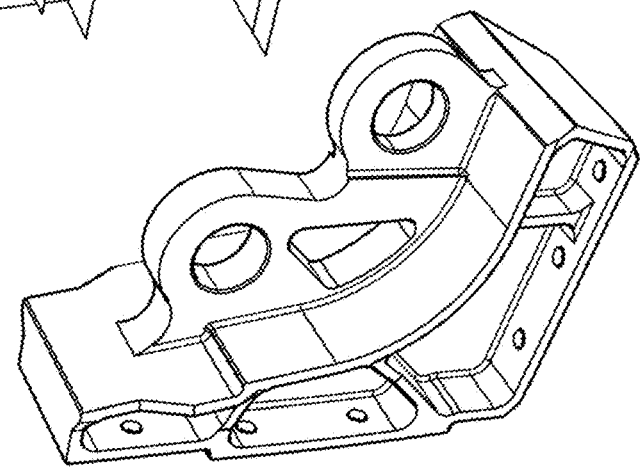

For clarity, the following paragraphs are presented in reference to an example industrial part, the "QIF Bracket" shown in FIGS. 3A-C. When viewed on the user's screen the bracket appears smooth and continuous—essentially as it is meant to appear post-manufacturing (FIG. 3A). What is stored inside the CAD model, however, is over 1000 independent surfaces and curves that have been trimmed to create the representation seen by the user on a computer screen. The untrimmed surfaces are shown in FIG. 3B, and the trimmed surfaces are illustrated in an exploded view in FIG. 3C. The gaps between these trimmed surfaces may be problematic if the model is to be used for downstream applications, in particular inspection/metrology workflows that do not tolerate non-watertight representations.

Figure 4:
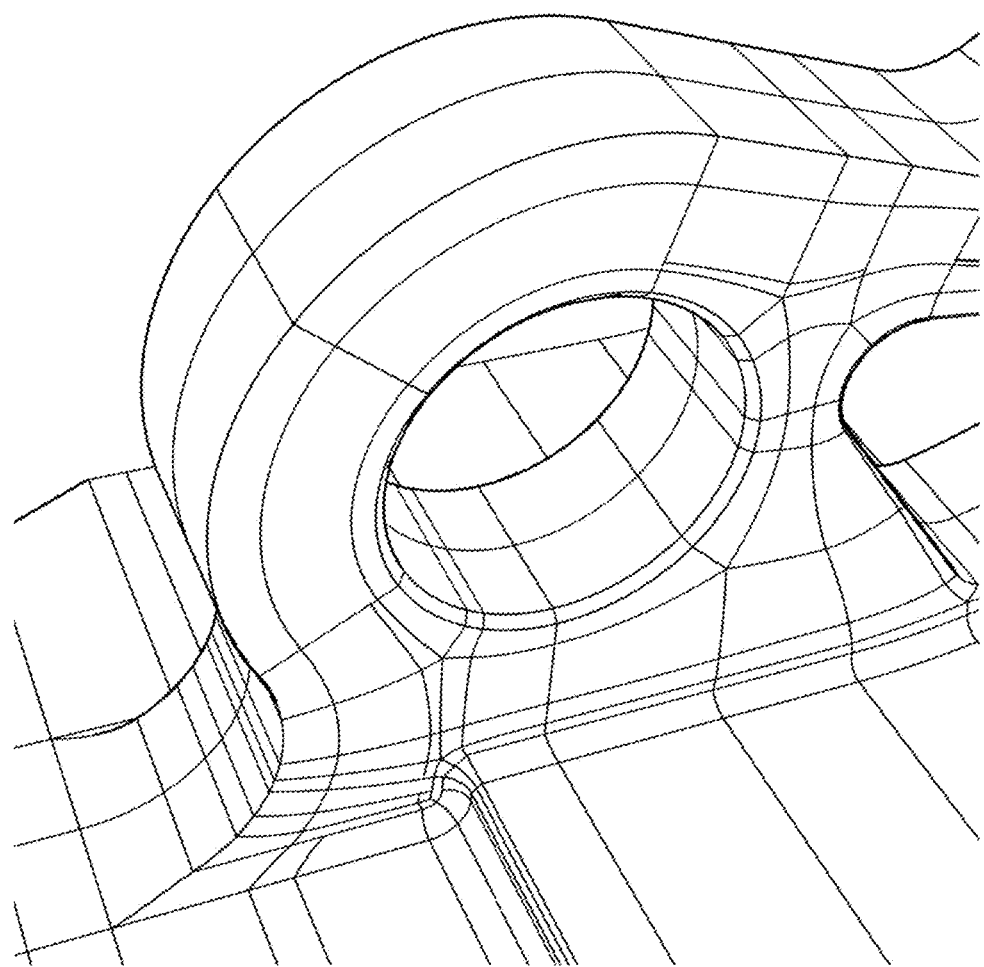
FIG. 4 illustrates a watertight spline model, according to some embodiments.
Figure 4:
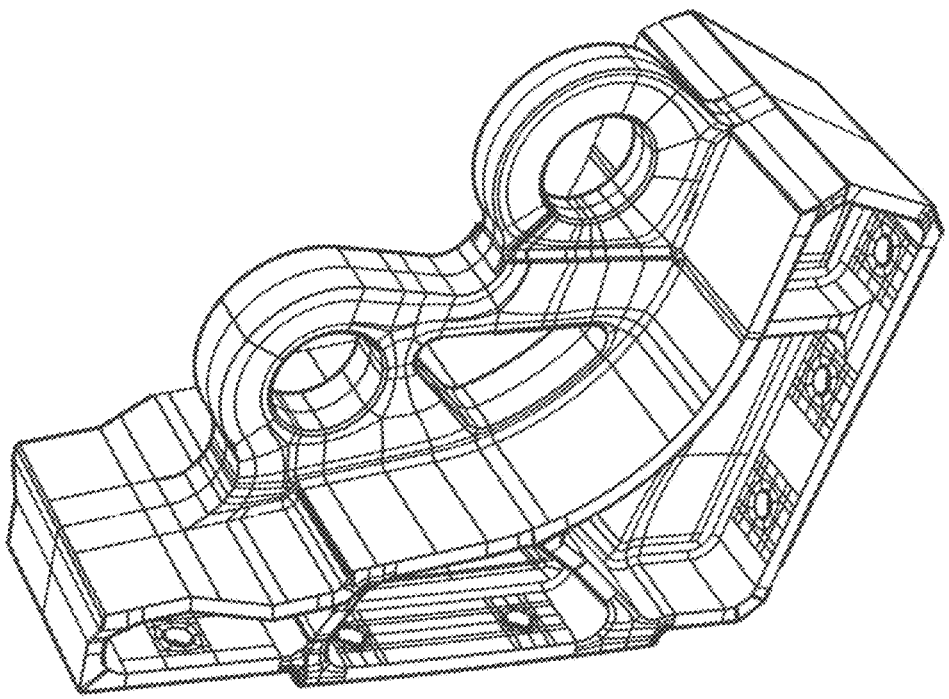
Figure 5:
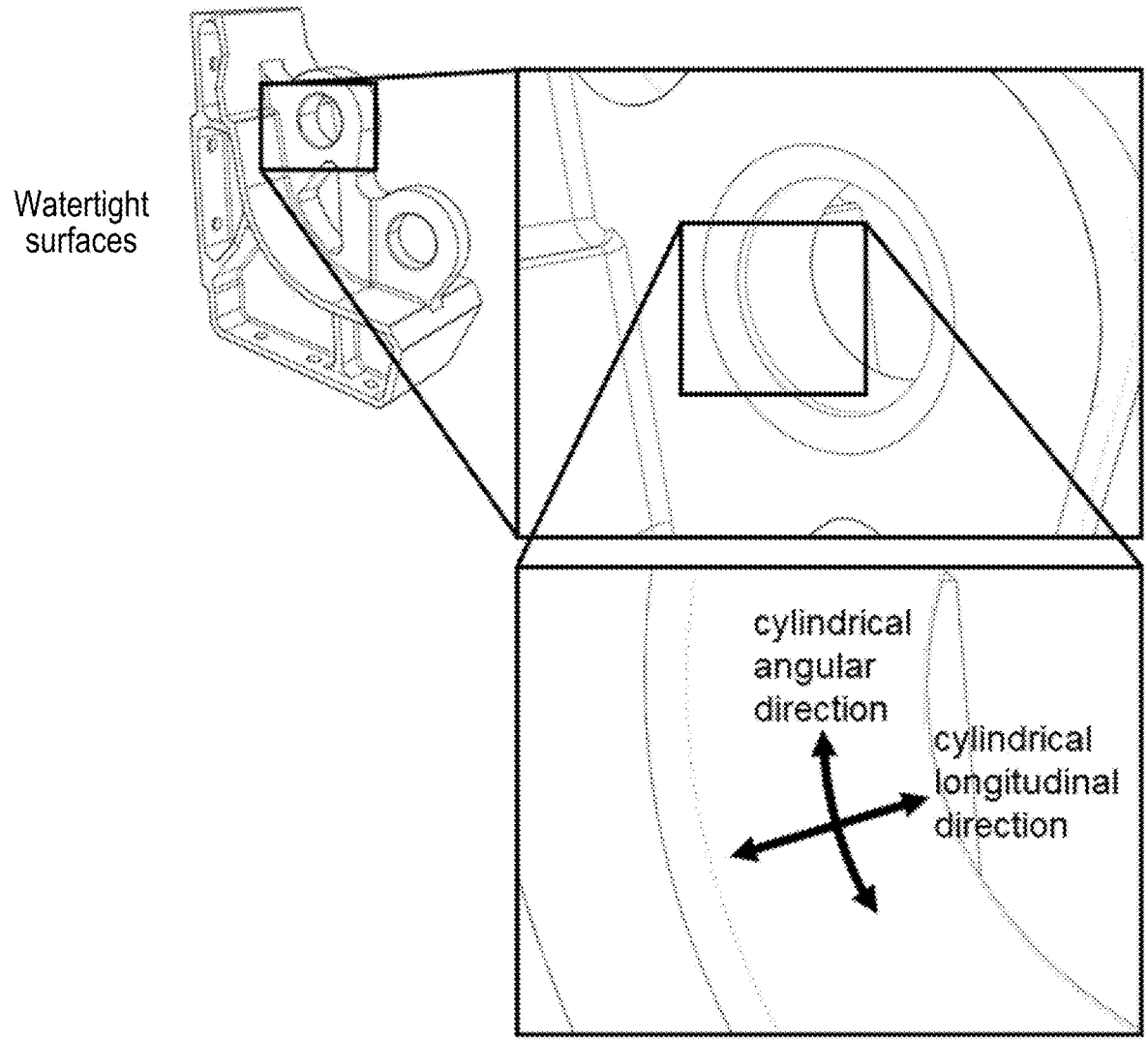
FIG. 5 illustrates the angular and longitudinal cylindrical directions on a portion of a watertight spline model, according to some embodiments.

Embodiments herein utilize a watertight model of the QIF bracket, an example of which is shown in FIG. 4. The illustrated model consists entirely of tensor product NURBS surfaces. The watertight model has no gaps and maintains the original model tolerance. The model shown in FIG. 4 includes smooth continuous spline definitions of the surface. For example, in FIG. 5, the holes may be defined by perfect circles with angular and longitudinal cylindrical directions, rather than as faceted approximations as would be expected with a mesh representation.

Description of Watertight Spline Morphing Functionality

CAD model morphing procedures may utilize curve and surface warping. A warping function, for example, may deform a curve segment or surface region logically by control point repositioning. The warping function may define the control point repositioning as the original control point location and a deviation vector, and is often described by several complementary components (e.g., warp shape, warp distance, warp direction, etc.). Shape operators are a subset of shape modifications that may be used to alter local segments or regions on curves and surfaces. The functions may directly modify associated control points to a desired behavior.

A general framework for utilizing shape operators may proceed by first specifying a local curve segment or surface region for an existing curve or surface, within which the shape modification is to occur. Knot refinement may then be used to introduce more control points locally. Control points whose influence is local to the specified segment or region may then be repositioned according to various parameters and/or functions. Finally, knot removal to within a specified tolerance may be applied to the local segment or region in order to reduce the number of defining control points.

The moving of original control points is referred to herein as control point repositioning. When shape modification functions are applied to the original control points, they may be repositioned to reflect the desired curve segment or surface region behavior. Warping is one particular manner of applying control point repositioning. Analytic surface representations in CAD (e.g., cylinders, spheres, etc.) may not admit such shape modification, as their shape is controlled by a limited number of fixed geometric attributes constrained to a limited number of specific geometric forms.

In contrast to standard warping functions, morphing methods associated with described embodiments start with the parametric structure (i.e., spline data in the form of degree, knot vector, etc.) from the existing watertight spline representation along with points to interpolate or approximate (e.g., least-squares fit) that were obtained during the inspection process. Interpolation and/or approximation algorithms may be used to provide a morphed representation by defining the repositioned control points of the watertight spline representation. The warp function may then be recast to back-calculate (e.g., back solve) for the deviation vector to establish the relationship between the geometry of the as-designed model (e.g., either a native CAD model or a geometrically watertight spline model) and the morphed as-measured model. Advantageously, output as defined by the warp algorithm (the repositioned control points) may be used to determine the update function (deviation vectors and complementary components) that may be used as input when utilizing the warp function in a standard manner. In other words, because the constructed warp function is described as a spline model that is commensurate with the as-designed geometrically watertight spline model, the warp function may be useable to modify and improve the inspection/metrology process in a more streamlined manner, as deviations from the as-designed model indicated by the warp function are described in a model language that is directly relatable to the original as-designed model. This may be based on an assumed relationship between the control points a priori via a watertight spline representation.

Performance of the above-described methodology may depend on the point density of the inspection data, as it establishes the form of the morphed representation through interpolation/approximation. In general, the greater number of points collected during inspection, the higher the confidence in the accuracy of the morph model description to the as-built part (e.g., assuming a uniform precision in the data).

In contrast to the limited geometric description provided in a model described by analytic surface representations in CAD (e.g., cylinders, spheres, etc.), shape control of a CAD model represented by splines allows for modification of the geometric form by utilizing warping and shape modifiers. Advantageously, the model description may enable more adaptable, precise, and accurate characterizations of the warp function.

In some embodiments, the quality of the morph methodology (e.g., the accuracy of the warp function) may be improved without necessarily increasing the inspection point density by utilizing semantic PMI. The semantic PMI may be directly associated with the CAD design model, or alternatively it may be added during the inspection process. As described above, this semantic PMI data is not necessary to perform the morphing procedure, as point data from the inspection process may be interpolated without using semantic PMI to constrain the interpolation. However, utilizing semantic PMI may augment the method by providing a well-informed path for the interpolation or approximation of features and/or characteristics that are under inspection scrutiny. Assumptions on the admissible shape and form of the morphed data may be made based on shape control and constraints interpreted from the available semantic PMI.

Accordingly, inspection point densities at these features or characteristics may be optimized utilizing auxiliary data in the form of semantic PMI. One specific example of utilizing semantic PMI is described in referenced to FIG. 6. For example, in FIG. 6, semantic PMI may be included for the illustrated part in the vertical direction, which categorizes the surface as a ruled surface in the vertical direction. This information may be utilized to interpolate between radial measurement points in the vertical direction, such that a desired threshold accuracy of the inspection model may be obtained with a lower density sampling of measurement points.

Figure 6:
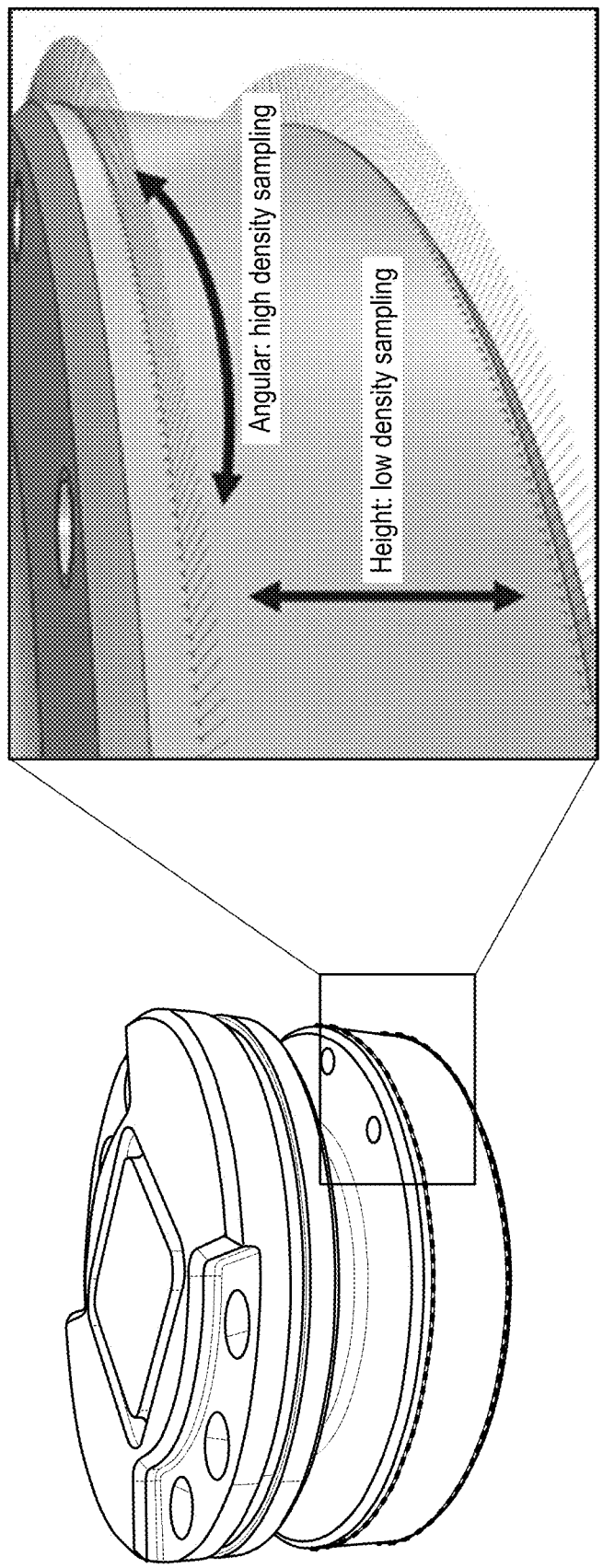
FIG. 6 illustrates high and low sampling densities in two different directions on a cylinder portion of an object, according to some embodiments.

Utilizing conventional CAx descriptions, from a CAD perspective the primitive cylinder description of the identified region shown in FIG. 6 may be cast to a spline (NURBS) surface and a water-tighting procedure may be performed. For example, it may be assumed that the feature has a "cylindricity" characteristic as a form control, and the manufacturing techniques used may allow for assumptions about the "as-measured" and "as-manufactured" shape. For the aspects of geometric and solid modeling, and specifically for cylinders, behavior may be assumed similar to a ruled surface (cylindrical parent representation), in which the radius of the cylinder does not deviate locally along the height of the cylinder but may be interpolated by a discrete number of points in the direction of its height that interpolate by least-squares fit with appropriate tangent constraints. This is an assumed "measurement-intent" by the quality assurance (QA) engineer. In addition, sample points may be made denser in the angular direction than in the vertical direction, as the geometry in the angular direction of the cylinder may deviate locally more than in the direction of the height of the cylinder. This may be incorporated as another "measurement-intent" by the QA engineer.

Figure 7:
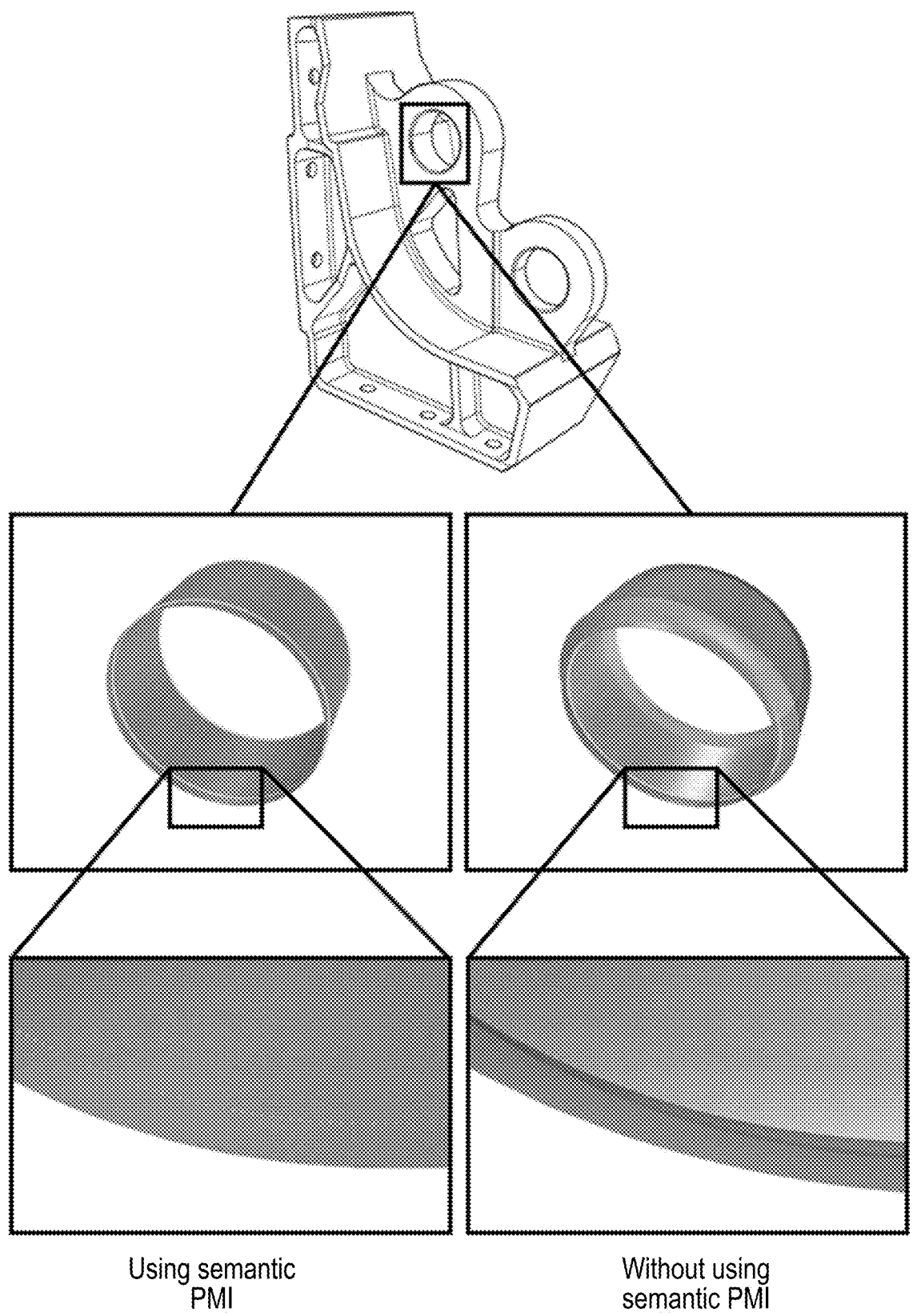
FIG. 7 illustrates two models of a cylindrical portion of an object that are constructed with and without semantic product and manufacturing information (PMI), according to some embodiments.

More generally, the semantic PMI may be used to constrain the interpolation more accurately between adjacent measurement points. For example, the semantic PMI may indicate a curvature of a surface along a particular direction, and interpolation constraints may be derived based on the semantic PMI to interpolate between measurement points in a way that incorporates the indicated curvature (e.g., instead of a linear interpolation). FIG. 7 illustrates a reconstruction of a cylindrical portion of an object with (left) and without (right) using semantic PMI. The right reconstruction, exhibits a ribbed character, as the reconstruction does not account for the cylindricity of the cylindrical portion. That is, the "measurement-intent" of sampling a less dense number of points along the height of the cylindrical feature was not taken into account in updating the shape of the object along this direction (for the right reconstruction). This results in localized distortions along this direction as indicated at the dense bands of sample points in the angular direction of the cylinder. Such a morph may not accurately characterize the as-manufactured object based on the inspection data. Incorporation of additional semantic PMI may be used to resolve this. Accordingly, the images on the left illustrate a more accurate reconstruction of the cylinder by utilizing the semantic PMI.

Figure 8:
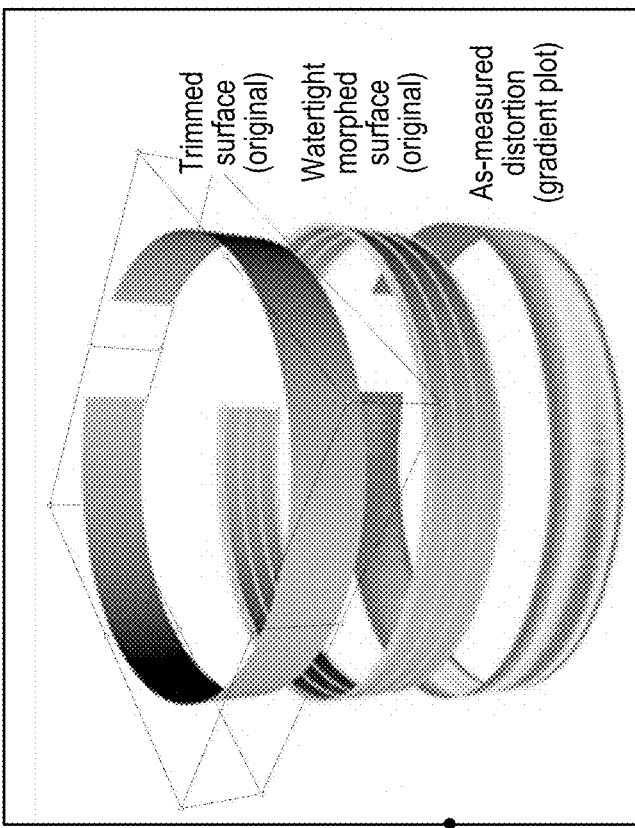
FIG. 8 illustrates the as-designed model, the inspection model, and the warp function for a cylindrical portion of an object, according to some embodiments.
Figure 8:
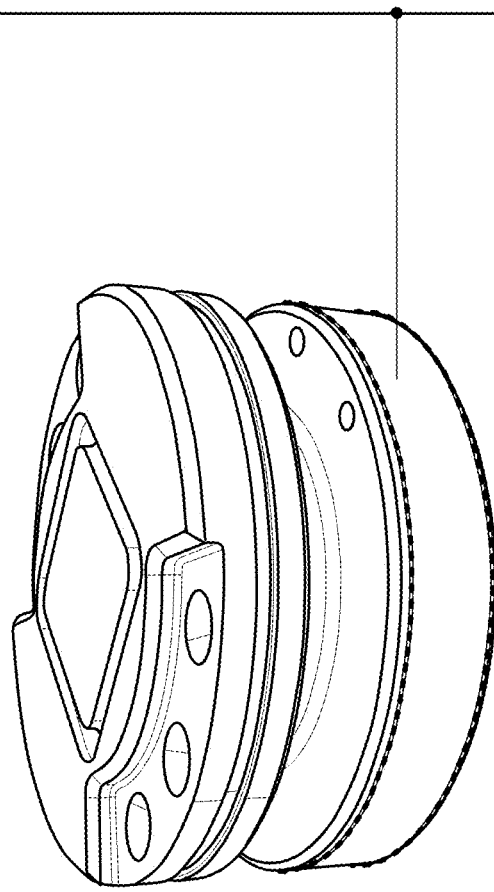
Figure 9:
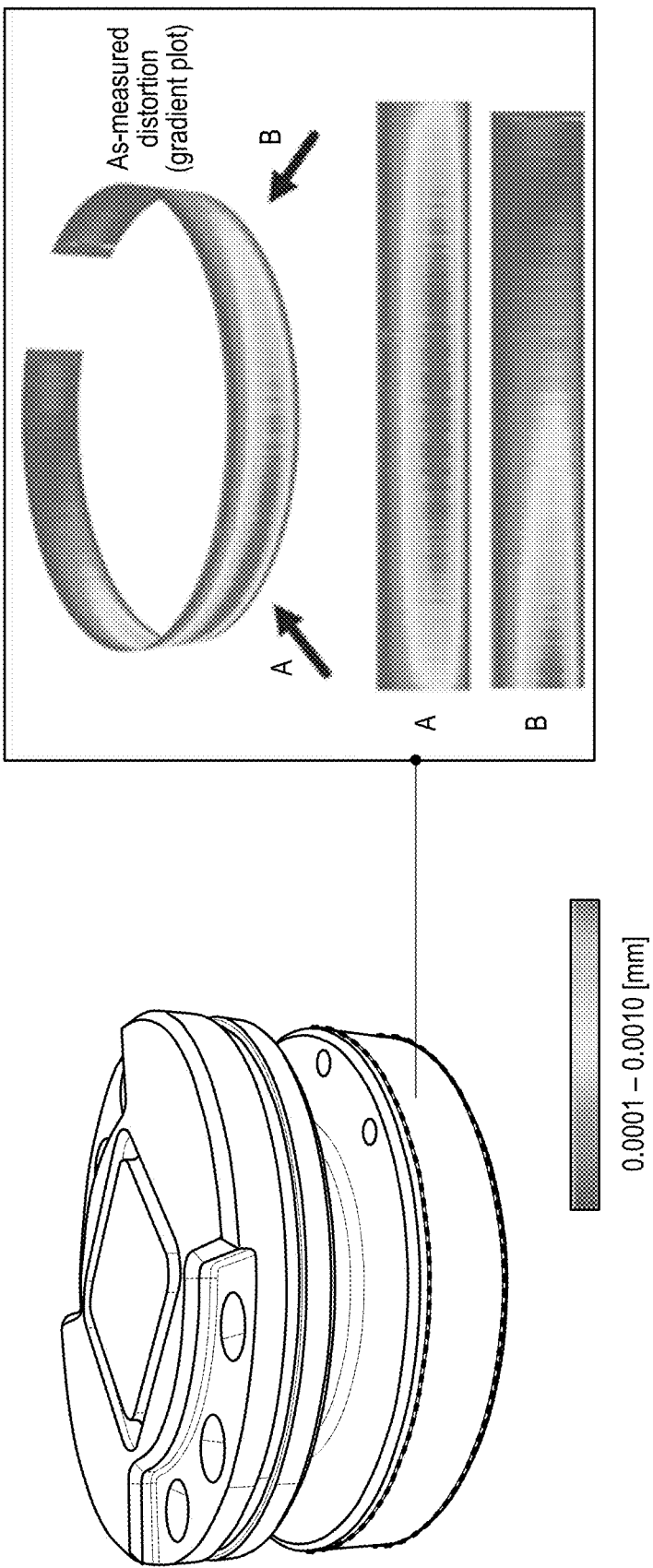
FIG. 9 illustrates in grayscale a visual representation of the warp function, according to some embodiments.

FIG. 8 illustrates a non-watertight trimmed b-rep, a watertight spline model, and a warp function determined from the watertight spline model (using an as-measured inspection model, not illustrated). The warp function is illustrated as a distortion gradient plot that characterizes the difference between the as-designed and as-measured models). FIG. 9 illustrates the as-measured distortion gradient plot (e.g., the as-designed to as-measured comparison) from multiple angles, illustrating the asymmetrical nature of the geometrically resolved data.

Embodiments herein, with or without utilizing semantic PMI as an additional input, may provide many advantages to the user. As one example, a relationship is created (i.e., digital twin) between the CAD design model and the morphed, as-measured inspection model. Because the CAD model is directly modified in this operation from the input data, the laborious process of generating a mesh, tessellation, or other intermediate geometric modeling representation based on inspection data may be avoided. Further, the relationship created between the design and morphed inspection models via embodiments described herein may provide a means of maintaining semantic PMI data throughout the design-through-inspection lifecycle. In addition, the interpretation of inspection data in the inspection plan is standardized, and the as-measured inspection model has a traceable, known, mathematically founded relationship to the CAD design model, unlike the tessellated or meshed models which are only related in the sense that they are both representations of the same object, but share no common pedigree or associativity.

Figure 10:
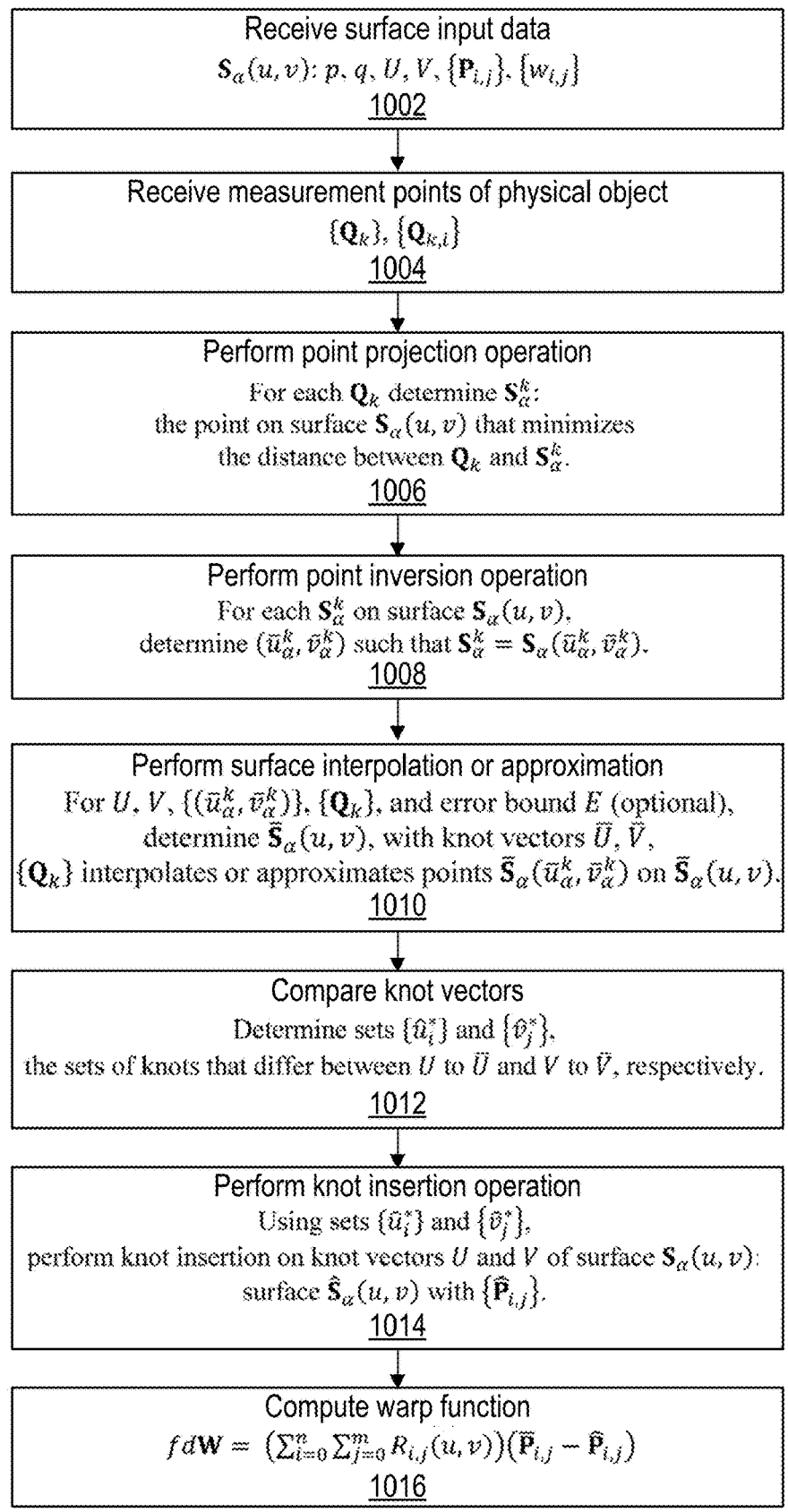
FIG. 10 illustrates a method for determining a warp function without utilizing semantic PMI, according to some embodiments.

FIG. 10—Determining Warp Function without Semantic PMI

FIG. 10 illustrates a method for determining a warp function without utilizing semantic PMI, which provides additional specific mathematical detail compared to the method shown in FIG. 2. The methods shown in FIG. 10 share some aspects with the methods described in reference to FIG. 2. In some embodiments, a method for determining a warp function without utilizing semantic PMI may proceed as described in the following steps:

At 1002, input data is received in the form of a watertight spline model and a point cloud data set. The watertight spline model may correspond to the "first" watertight spline model described in reference to FIG. 2, and the point cloud data set may correspond to the set of points. Each surface patch, $S_\alpha(u, v) = \Sigma_{i=0}^{n} \Sigma_{j=0}^{m} R_{i,j}(u, v) P_{i,j}$, in the watertight spline model may contain complete information in defining the surface for that surface domain $[u_0, u_{n+p+1}] \times [v_0, v_{m+q+1}]$, where:

$U = \{u_0, \ldots, u_i, \ldots, u_{n+p+1}\}$ is the knot vector in the parametric u-direction, $V = \{v_0, \ldots, v_j, \ldots, v_{m+q+1}\}$ is the knot vector in the parametric v-direction, $\{N_{i,p}(u)\}$ is the set of i-th B-spline basis functions of degree p, $\{N_{j,q}(v)\}$ is the set of j-th B-spline basis functions of degree q, $\{P_{i,j}\}$ is the set of (i,j) control points forming an $[n+1] \times [m+1]$ bidirectional control net, $\{w_{i,j}\}$ is the set of (i,j) weights corresponding to the control points, and $\{R_{i,j}(u, v) = (N_{i,p}(u) N_{j,q}(v) w_{i,j})/(\Sigma_{i=0}^{n} \Sigma_{j=0}^{m} N_{k,p}(u) N_{l,q}(v) w_{k,l})\}$ is the set of rational basis functions.

At 1004, a point cloud data is received, which may be measurement points of a physical object, in some embodiments. In various embodiments, the point cloud data may be a set of points associated with the surface as either:

$\{Q_k\}$ a set of unordered points, or $\{Q_{k,l}\}$ a set of points ordered bidirectionally.

At 1006, for each point in the set of point cloud data $Q_k$, a point projection operation is performed. For each $Q_k$, $S_\alpha^k$ is determined defined as the point on surface $S_\alpha(u, v)$ that minimizes the distance between $Q_k$ and $S_\alpha^k$. A variety of types of point projection operations may be used, as desired.

At 1008, for each projected point $S_\alpha^k$ a point inversion operation is performed. For each $S_\alpha^k$ on the surface $S_\alpha(u, v)$, the corresponding parameters $(\bar{u}_\alpha^k, \bar{v}_\alpha^k)$ are determined such that $S_\alpha^k = S_\alpha(\bar{u}_\alpha^k, \bar{v}_\alpha^k)$. The point inversion operation may be performed according to any of a variety of methodologies, as desired.

At 1010, for U, V, $\{(\bar{u}_\alpha^k, \bar{v}_\alpha^k)\}$, $\{Q_k\}$, and error bound E (optional), an interpolation or approximation surface operation is performed to determine $\bar{S}_\alpha(u, v)$, the surface morph that interpolates or approximates the point cloud data $\{Q_k\}$ at points $\bar{S}_\alpha(\bar{u}_\alpha^k, \bar{v}_\alpha^k)$ on $\bar{S}_\alpha(u, v)$. This surface, $\bar{S}_\alpha(u, v)$, is defined by knot vectors $\bar{U}, \bar{V}$, produced by the interpolation or approximation surface algorithm. The surface morph may correspond to the second watertight spline model or the inspection model described in reference to FIG. 2. Note that in some embodiments, step 206 of FIG. 2 (constructing the inspection model) may include each of steps 1006-1010 described here.

At 1012, knot vectors are compared (U compared to $\bar{U}$ and V compared to $\bar{V}$) to determine sets $\{\hat{u}_i^*\}$ and $\{\hat{v}_j^*\}$, where $\{\hat{u}_i^*\}$ and $\{\hat{v}_j^*;\}$ are the sets of knots that differ between U to $\bar{U}$ and V to $\bar{V}$, respectively.

At 1014, knot insertion is performed on knot vectors U and V of surface $S_\alpha(u, v)$ using sets $\{\hat{u}_i^*\}$ and $\{\hat{v}_j^*\}$, respectively. This produces surface $\hat{S}_\alpha(u, v)$ with $\{\hat{P}_{i,j}\}$.

At 1016, the warp function is determined using a region warping algorithm, $\bar{P}_{i,j} = \hat{P}_{i,j} + f dW$, where:

$f$ is a function defined as the warp shape, d is a constant defined as the warp distance, W is a vector defined as the warp direction, and $f dW$ is a function defined as the warp function.

Given $\{\bar{P}_{i,j}\}$ and $\{\hat{P}_{i,j}\}$ determine the warp function, $f dW = \bar{P}_{i,j} - \hat{P}_{i,j}$.

Given that $\bar{S}_\alpha(u, v)$ and $\hat{S}_\alpha(u, v)$ have the same degrees, knot vectors, and basis functions, the difference may be taken defined, as $\bar{S}_\alpha(u, v) - \hat{S}_\alpha(u, v) = (\Sigma_{i=0}^{n} \Sigma_{j=0}^{m} R_{i,j}(u, v) \hat{P}_{i,j}) - (\Sigma_{i=0}^{n} \Sigma_{j=0}^{m} R_{i,j}(u, v))(\bar{P}_{i,j} - \hat{P}_{i,j})$.

Due to the manner of construction above, we assert that the difference in surfaces is the warp between the surfaces such that $\bar{S}_\alpha(u, v) - \hat{S}_\alpha(u, v) = f dW$.

Equating the expressions for the difference in surfaces, we obtain the warp function in the applicable form $f dW = (\Sigma_{i=0}^{n} \Sigma_{j=0}^{m} R_{i,j}(u, v))(\bar{P}_{i,j} - \hat{P}_{i,j})$, in which the decomposition of the warp function's components may be made in various ways.

Note that the above description is defined specifically in three-dimensional Euclidean space, i.e., in terms of $S_\alpha^k(u, v)$, $\{P_{i,j}\}$, $\{w_{i,j}\}$, etc. Without loss of generality, a similar description can be made with minor adjustment for a description defined in homogeneous coordinates, i.e., in terms of $S_\alpha^w(u, v)$, $\{P_{i,j}^w\}$, etc. The transformation between three-dimensional space and homogeneous coordinates is well-defined and well-understood in the area of spline functions, computer-aided geometric design, and geometric modeling.

Figure 11:
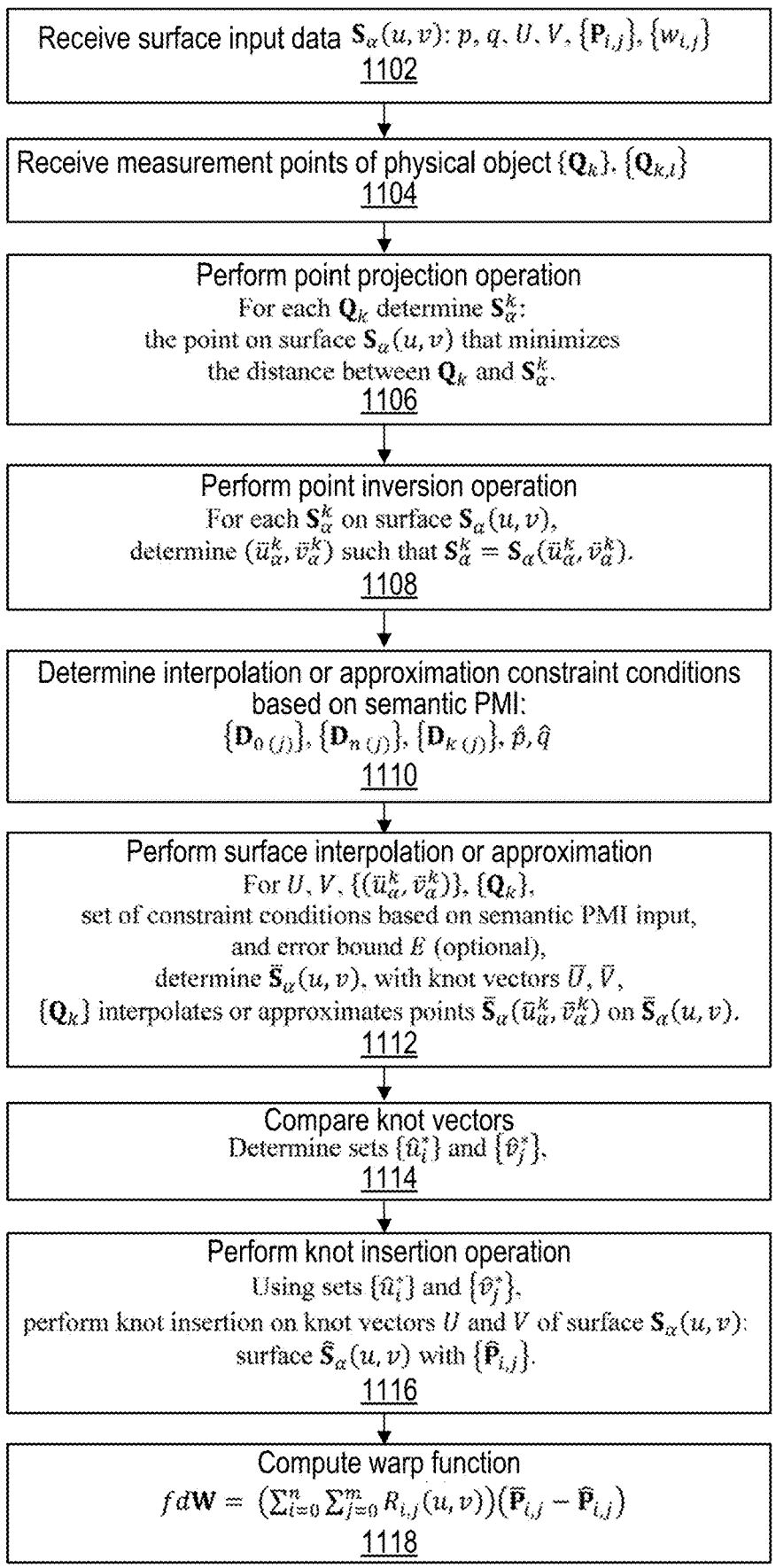
FIG. 11 illustrates a method for determining a warp function that utilizes semantic PMI, according to some embodiments.

FIG. 11—Determining Warp Function with Semantic PMI

FIG. 11 illustrates a method for determining a warp function that utilizes semantic PMI, and provides additional specific mathematical detail compared to the method shown in FIG. 2. The methods described in FIG. 11 share some aspects with the methods described in reference to FIG. 2. In some embodiments, a method for determining a warp function while utilizing semantic PMI may proceed as described in the following steps:

At 1102, input data is received in the form of a watertight spline model and a point cloud data set. The watertight spline model may correspond to the "first" watertight spline model described in reference to FIG. 2, and the point cloud data set may correspond to the set of points and the associated metadata. Each surface patch, $S_\alpha(u, v) = \Sigma_{i=0}^n \Sigma_{j=0}^m R_{i,j}(u, v) P_{i,j}$, in the watertight spline model may contain complete information in defining the surface for that surface domain $[u_0, u_{n+p+1}] \times [v_0, v_{m+q+1}]$:

$U = \{u_0, \ldots, u_i, \ldots, u_{n+p+1}\}$ is the knot vector in the parametric u-direction, $V = \{v_0, \ldots, v_i, \ldots, v_{m+q+1}\}$ is the knot vector in the parametric v-direction, $\{N_{i,p}(u)\}$ is the set of i-th B-spline basis functions of degree p, $\{N_{j,q}(v)\}$ is the set of j-th B-spline basis functions of degree q, $\{P_{i,j}\}$ is the set of (i,j) control points forming an $[n+1] \times [m+1]$ bidirectional control net, $\{w_{i,j}\}$ is the set of (i,j) weights corresponding to the control points, and $\{R_{i,j}(u, v) = (N_{i,p}(u) N_{j,q}(v) w_{i,j}) / (\Sigma_{i=0}^n \Sigma_{j=0}^m N_{k,p}(u) N_{l,q}(v) w_{k,l})\}$ is the set of rational basis functions.

At 1104, point cloud data is received, which may include measurement points of a physical object, in some embodiments. The point cloud data is assumed to be a set of points associated to the surface as either:

$\{Q_k\}$ a set of unorder points, or $\{Q_{k,l}\}$ a set of points ordered bidirectionally.

At 1106, for each point in the set of point cloud data $Q_k$ a point projection operation is performed, that is, for each $Q_k$ determine $S_\alpha^k$ defined as the point on surface $S_\alpha(u, v)$ that minimizes the distance between $Q_k$ and $S_\alpha^k$.

At 1108, for each projected point $S_\alpha^k$ a point inversion operation is performed. For each $S_\alpha^k$ on surface $S_\alpha(u, v)$, the corresponding parameters $(\bar{u}_\alpha^k, \bar{v}_\alpha^k)$ are determined such that $S_\alpha^k = S_\alpha^k(\bar{u}_\alpha^k, \bar{v}_\alpha^k)$.

At 1110, surface interpolation or approximation constraint conditions are determined based on the semantic PMI. Based on the specific feature associated with surface patch $S_\alpha(u, v)$ from semantic PMI or other metadata inputs on geometric form (e.g., cylindricity, planarity, sphericity, etc.), one or more of the following interpolation or approximation constraint conditions (i.e., fit parameters, continuity conditions, end conditions, specified degrees, etc.) may be determined from the feature classification:

$\{D_{0\ (j)}\}$ a set of j-th derivative vectors at the start of the surface, $\{D_{n\ (j)}\}$ a set of j-th derivative vectors at the end of the surface, $\{D_{k\ (j)}\}$ a set of j-th derivative vectors corresponding to each point in $\{Q_k\}$, and $\hat{p}$, $\hat{q}$ specified surface degrees in the i-th and j-th directions, respectively.

At 1112, using U, V, $\{(\bar{u}_\alpha^k, \bar{v}_\alpha^k)\}$, $\{Q_k\}$, the set of constraint conditions based on semantic PMI input, and error bound E (optional), an interpolation or approximation surface operation is performed to determine $\bar{S}_\alpha(u, v)$, the surface morph that interpolates or approximates the point cloud data $\{Q_k\}$ at points $\bar{S}_\alpha(\bar{u}_\alpha^k, \bar{v}_\alpha^k)$ on $\bar{S}_\alpha(u, v)$. This surface, $\bar{S}_\alpha(u, v)$, is defined by knot vectors $\bar{U}$, $\bar{V}$, produced by the interpolation or approximation surface algorithm. The surface morph may correspond to the second watertight spline model or the inspection model described in reference to FIG. 2. Note that in some embodiments, step 206 of FIG. 2 (constructing the inspection model) may include each of steps 1106-1112 described here.

At 1114, the knot vectors are compared (U compared to $\bar{U}$ and V compared to $\bar{V}$) to determine sets $\{\hat{u}_i^*\}$ and $\{\hat{v}_j^*\}$, which are the sets of knots that differ between U to $\bar{U}$ and V to $\bar{V}$, respectively.

At 1116, knot insertion is performed on knot vectors U and V of surface $S_\alpha(u, v)$ using sets $\{\hat{u}_i^*\}$ and $\{\hat{v}_j^*\}$, respectively. This produces surface $\hat{S}_\alpha(u, v)$ with $\{\hat{P}_{i,j}\}$.

At 1118, the region warping algorithm is utilized to determine the warp function, $\bar{P}_{i,j} = \hat{P}_{i,j} + fdW$, where:

$f$ is a function defined as the warp shape, d is a constant defined as the warp distance, and W is a vector defined as the warp direction, and $fdW$ is a function defined as the warp function.

Given $\{\bar{P}_{i,j}\}$ and $\{\hat{P}_{i,j}\}$ determine the warp function, $fdW = \bar{P}_{i,j} - \hat{P}_{i,j}$.

Given that $\bar{S}_\alpha(u, v)$ and $\hat{S}_\alpha(u, v)$ have the same degrees, knot vectors, and basis functions, the difference can be taken defined as $\bar{S}_\alpha(u, v) - \hat{S}_\alpha(u, v) = (\Sigma_{i=0}^n \Sigma_{j=0}^m R_{i,j}(u, v) \bar{P}_{i,j}) - (\Sigma_{i=0}^n \Sigma_{j=0}^m R_{i,j}(u, v) \hat{P}_{i,j}) = (\Sigma_{i=0}^n \Sigma_{j=0}^m R_{i,j}(u, v))(\bar{P}_{i,j} - \hat{P}_{i,j})$.

Due to the manner of construction above, we assert that the difference in surfaces is the warp between the surfaces such that $\bar{S}_\alpha(u, v) - \hat{S}_\alpha(u, v) = fdW$.

Equating the expressions for the difference in surfaces, we obtain the warp function in the applicable form $fdW = (\Sigma_{i=0}^n \Sigma_{j=0}^m R_{i,j}(u, v))(\bar{P}_{i,j} - \hat{P}_{i,j})$, in which the decomposition of the warp function's components may be made in various ways.

Note that the above description is defined specifically in three-dimensional Euclidean space, i.e., in terms of $S_\alpha(u, v)$, $\{P_{i,j}\}$, $\{w_{i,j}\}$, etc. Without loss of generality, a similar description can be made with minor adjustment for a description defined in homogeneous coordinates, i.e., in terms of $S_\alpha^w(u, v)$, $\{P_{i,j}^w\}$, etc. The transformation between three-dimensional space and homogeneous coordinates is well-defined and well-understood in the area of spline functions, computer-aided geometric design, and geometric modeling.

Description of Data Interchange Aspects

The quality and maturity of QIF data exports from CMM software may vary greatly. Depending on the software vendor, version of QIF, and data requested, the form of the QIF export may or may not contain inspection PMI (e.g., features, characteristics, etc.). Also, the nominal and actual points may be organized and consolidated logically by model feature reference or bulk dumped in large homogeneous sets. Interchange and translation vendors do have interchange products available, with varying levels of read/write capability between them. However, the level of semantic PMI interchange is fairly limited and most mapping information centers around the MBD and geometric modeling definition.

Various embodiments may implement different methodologies for performing data exchange. For example, for the morphing process alone, nominal-actual point pairs may be used to enable creation of the as-measured model from a watertight as-designed model. In another example, for the morphing process alone, actual points without nominal locations may be used to enable creation of the as-measured model from a watertight as-designed model. Alternatively, for creating the morphed as-measured model and managing the semantic PMI associated with the inspection/metrology, a means to persist the feature reference to the MBD may be created.

In order to process the morphed models, nominal-actual point pairs may be bulk exported feature-by-feature in a specific format that only contains this minimal point data. A temporary IO tool may be used to read in this data into memory for use in testing the morph algorithm. Formal use of both QIF with STEP may be involved to manage all of the as-designed and as-measured data in a combined and coordinated manner.

Note that various embodiments of the techniques disclosed herein may be implemented in a variety of different ways. For example, the methods described herein may be performed by software executing on a computer system. However, while some embodiments are described in terms of one or more programs executing on a computer, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable memory medium comprising program instructions which, when executed by a processor, cause a computer to:
   receive an as-designed watertight spline model of an object design, wherein the as-designed watertight spline model comprises a computer-aided design (CAD) model;
   receive a plurality of measurement points of a first tangible object, wherein the first tangible object is manufactured based on the object design;
   construct an as-inspected model of the first tangible object based at least in part on the plurality of measurement points and the as-designed watertight spline model, wherein the as-inspected model comprises a computer-aided inspection (CAI) model;
   determine a discrepancy between knot vectors of the as-inspected model and knot vectors of the as-designed watertight spline model;
   perform knot insertion on the knot vectors of the as-designed watertight spline model to remove the determined discrepancy such that the knot vectors of the as-designed watertight spline model and the knot vectors of the as-inspected model are the same;
   determine a warp function of the first tangible object based on a difference between the as-designed watertight spline model and the as-inspected model of the first tangible object, wherein the warp function comprises a continuous function approximating differences between the first tangible object and the object design; and
   store the warp function in the non-transitory computer-readable memory medium.

2. The non-transitory computer-readable memory medium of claim 1, wherein the program instructions are further executable to cause the computer to:
   receive semantic product manufacturing information (PMI) for the object design,
   wherein constructing the as-inspected model of the first tangible object is performed further based at least in part on the semantic PMI.

3. The non-transitory computer-readable memory medium of claim 2,
   wherein, in constructing the as-inspected model based at least in part on the semantic PMI, the program instructions are further executable to cause the computer to:
      determine one or more constraints of the first tangible object based on the semantic PMI; and
      interpolate between adjacent ones of the plurality of measurement points based on the one or more constraints, wherein the one or more constraints are determined based at least in part on a sampling density of the plurality of measurement points indicated by the semantic PMI.

4. The non-transitory computer-readable memory medium of claim 2,
   wherein, in constructing the as-inspected model based at least in part on the semantic PMI, the program instructions are further executable to cause the computer to:
      determine one or more control point derivatives for the as-inspected model based at least in part on geometric constraints indicated by the semantic PMI.

5. The non-transitory computer-readable memory medium of claim 1,
   wherein, in constructing the as-inspected model of the first tangible object based at least in part on the plurality of measurement points and the as-designed watertight spline model, the program instructions are further executable to cause the computer to perform an interpolation or approximation procedure of the plurality of measurement points to the as-designed watertight spline model.

6. The non-transitory computer-readable memory medium of claim 1,
   wherein the plurality of measurement points is received and the warp function is determined in real time during a manufacturing process of the first tangible object, wherein the program instructions are further executable to cause the computer to:
   modify the manufacturing process based at least in part on the warp function.

7. The non-transitory computer-readable memory medium of claim 6,
   wherein, in modifying the manufacturing process based at least in part on the warp function, the program instructions are further executable to cause the computer to:

modify the as-designed watertight spline model to compensate for one or more errors determined from the warp function; and modify one or more parameters of a manufacturing machine performing the manufacturing process based on the warp function.

8. The non-transitory computer-readable memory medium of claim 7, wherein, in modifying the one or more parameters of the manufacturing machine based on the warp function, the program instructions are further executable to cause the computer to:

determine a compensation function based on the warp function; and provide the compensation function to the manufacturing machine to modify the one or more parameters.

9. The non-transitory computer-readable memory medium of claim 1, wherein the program instructions are further executable to cause the computer to:

display, on a display, a colorized visual representation of the warp function.

10. The non-transitory computer-readable memory medium of claim 1, wherein the program instructions are further executable to cause the computer to:

receive a CAD boundary representation (B-rep) model of the object design; and construct the as-designed watertight spline model based at least in part on the CAD B-rep model.

11. The non-transitory computer-readable memory medium of claim 1, wherein the warp function is useable to modify the manufacturing process to reduce a discrepancy between the object design and a second object produced through the modified manufacturing process.

12. The non-transitory computer-readable memory medium of claim 1, wherein, in constructing the as-inspected model of the first tangible object based at least in part on the plurality of measurement points and the as-designed watertight spline model, the program instructions are executable to cause the computer to:

perform an interpolation or approximation procedure utilizing a spline structure of the as-designed watertight spline model to determine a plurality of degrees, control points and knot vectors of the as-inspected model of the first tangible object.

13. The non-transitory computer-readable memory medium of claim 1, wherein the as-inspected model of the first tangible object comprises a same spline structure as the as-designed watertight spline model.

14. A non-transitory computer-readable memory medium comprising program instructions which, when executed by a processor, cause a computer to:

receive a first watertight spline model of a first tangible object;

receive a set of points from a second tangible object and metadata associated with the set of points;

construct a second watertight spline model of the second tangible object based at least in part on the set of points, the metadata, and the first watertight spline model:

determine a discrepancy between knot vectors of the first watertight spline model and knot vectors of the second watertight spline model;

perform knot insertion on the knot vectors of the first watertight spline model to remove the determined discrepancy such that the knot vectors of the first watertight spline model and the knot vectors of the second watertight spline model are the same;

determine a warp function based on a difference between the first watertight spline model and the second watertight spline model, wherein the warp function comprises a continuous function approximating differences between the first tangible object and the second tangible object; and store the warp function in the non-transitory computer-readable memory medium.

15. The non-transitory computer-readable memory medium of claim 14, wherein the first watertight spline model is described in a first computer-aided (CAx) model domain, and wherein the second watertight spline model is described in a second CAx model domain.

16. The non-transitory computer-readable memory medium of claim 14, wherein the metadata comprises one or more of:
product and manufacturing information (PMI); and
product lifecycle management (PLM) data.

17. The non-transitory computer-readable memory medium of claim 14, wherein the set of points of the first tangible object comprises one of:

machine feedback data collected during a manufacturing process of the first tangible object;

displacement data generated via finite element or isogeometric analysis or simulations;

shape modification data from a topology or shape optimization algorithm; or inspection data from an inspection of the first tangible object.

18. A non-transitory computer-readable memory medium comprising program instructions which, when executed by a processor, cause a computer to:

determine a first watertight spline model of a physical object;

apply a stress to the physical object;

while applying the stress to the physical object, determine a second watertight spline model of the physical object while experiencing strain, wherein the first and second watertight spline models are described in at least one computer-aided (CAx) model domain, and wherein knot vectors of the first and second watertight spline models are the same;

determine, by the computer, a warp function based on a difference between the second watertight spline model and the first watertight spline model, wherein the warp function comprises a continuous function approximating differences between a shape of the physical object while experiencing strain and while not experiencing strain;

determine a first constitutive relationship for the physical object based at least in part on the warp function; and store the first constitutive relationship in the non-transitory computer-readable memory medium.

19. The non-transitory computer-readable memory medium of claim 18, wherein the program instructions are further executable to cause the computer to:

determine a resilience metric for the physical object based on a difference between the first constitutive relationship and a second constitutive relationship of a material composition of the physical object.

20. The non-transitory computer-readable memory medium of claim 18, wherein the first constitutive relationship characterizes a degree of physical or material change in the physical object.

21. The non-transitory computer-readable memory medium of claim 18, wherein the program instructions are further executable to cause the computer to:
update a documented constitutive relationship of a material composition of the physical object based on the first constitutive relationship.

* * * * *